(12) United States Patent
Sun et al.

(10) Patent No.: US 12,315,498 B1
(45) Date of Patent: May 27, 2025

(54) COMPUTING ACTION RECOMMENDATION SYSTEM FOR FACILITATING REAL TIME COMMUNICATION

(71) Applicant: Amazon Technologies, Inc., Seattle, WA (US)

(72) Inventors: Nicholas Sun, Mercer Island, WA (US); Phillip H. Keung, Seattle, WA (US); Fan Luo, Seattle, WA (US); Wei Niu, Bellevue, WA (US)

(73) Assignee: Amazon Technologies, Inc., Seattle, WA (US)

(*) Notice: Subject to any disclaimer, the term of this patent is extended or adjusted under 35 U.S.C. 154(b) by 355 days.

(21) Appl. No.: 18/067,561

(22) Filed: Dec. 16, 2022

(51) Int. Cl.
| | | |
|---|---|---|
| *G10L 15/22* | (2006.01) | |
| *G06F 3/16* | (2006.01) | |
| *G06N 20/00* | (2019.01) | |
| *G10L 15/06* | (2013.01) | |
| *G10L 15/18* | (2013.01) | |
| *G10L 15/30* | (2013.01) | |
| *H04M 3/51* | (2006.01) | |
| *G10L 15/08* | (2006.01) | |

(52) U.S. Cl.
CPC .......... *G10L 15/1815* (2013.01); *G06F 3/167* (2013.01); *G06N 20/00* (2019.01); *G10L 15/063* (2013.01); *G10L 15/22* (2013.01); *G10L 15/30* (2013.01); *H04M 3/5183* (2013.01); *G10L 2015/0635* (2013.01); *G10L 2015/088* (2013.01); *G10L 2015/225* (2013.01)

(58) Field of Classification Search
CPC ... G10L 15/1815; G10L 15/063; G10L 15/22; G10L 15/30; G10L 2015/0635; G10L 2015/088; G10L 2015/225; G06F 3/167; G06N 20/00; H04M 3/5183
See application file for complete search history.

(56) References Cited

U.S. PATENT DOCUMENTS

| | | | |
|---|---|---|---|
| 11,539,650 B2 * | 12/2022 | Wayne | ................... H04L 51/02 |
| 2020/0117858 A1 * | 4/2020 | Freeman | ............... G06F 40/117 |
| 2022/0046129 A1 * | 2/2022 | Clodore | ............. H04M 3/5175 |
| 2022/0208177 A1 * | 6/2022 | Chandra | ................ G06F 40/30 |
| 2022/0310078 A1 * | 9/2022 | Schuetz | ............. G10L 15/1815 |
| 2023/0037894 A1 * | 2/2023 | Arya | ....................... G06F 40/40 |

* cited by examiner

*Primary Examiner* — Abul K Azad
(74) *Attorney, Agent, or Firm* — Knobbe, Martens, Olson & Bear, LLP

(57) ABSTRACT

Techniques for action recommendation based on conversational log for real time assistance are described. Pre-generated intent clusters can be used to identify a relevant intent of a user in a given conversation between the user and a contact center agent. Based on the identified intent, certain recommended actions can be performed on the computing device of the contact center agent to facilitate the conversation between the user and the contact center agent. Feedback relating to the conversation and/or the recommended actions can be recorded and used to update the pre-generated intent clusters to improve the quality and relevance of the actions recommended for future conversations.

20 Claims, 5 Drawing Sheets

COMPUTING ACTION RECOMMENDATION SYSTEM FOR FACILITATING REAL TIME COMMUNICATION

BACKGROUND

Machine learning (ML) is the study of computer algorithms that can improve automatically through experience and by the use of data. ML algorithms build a model based on sample data, known as training data, in order to make predictions or decisions without being explicitly programmed to do so. ML algorithms are used in a wide variety of applications, such as in medicine, email filtering, speech recognition, and computer vision, where it is difficult or unfeasible to develop conventional algorithms to perform the needed tasks.

Natural language processing (NLP) is an application for ML (and a sub-field of artificial intelligence) concerned with the interactions between computers and human language, in particular how to program computers to process and analyze large amounts of natural language data. The goal is a computer capable of understanding the contents of documents, including the contextual nuances of the language within them. The technology can then accurately extract information and insights contained in the documents as well as categorize and organize the documents themselves.

DETAILED DESCRIPTION

Introduction

Figure 1:
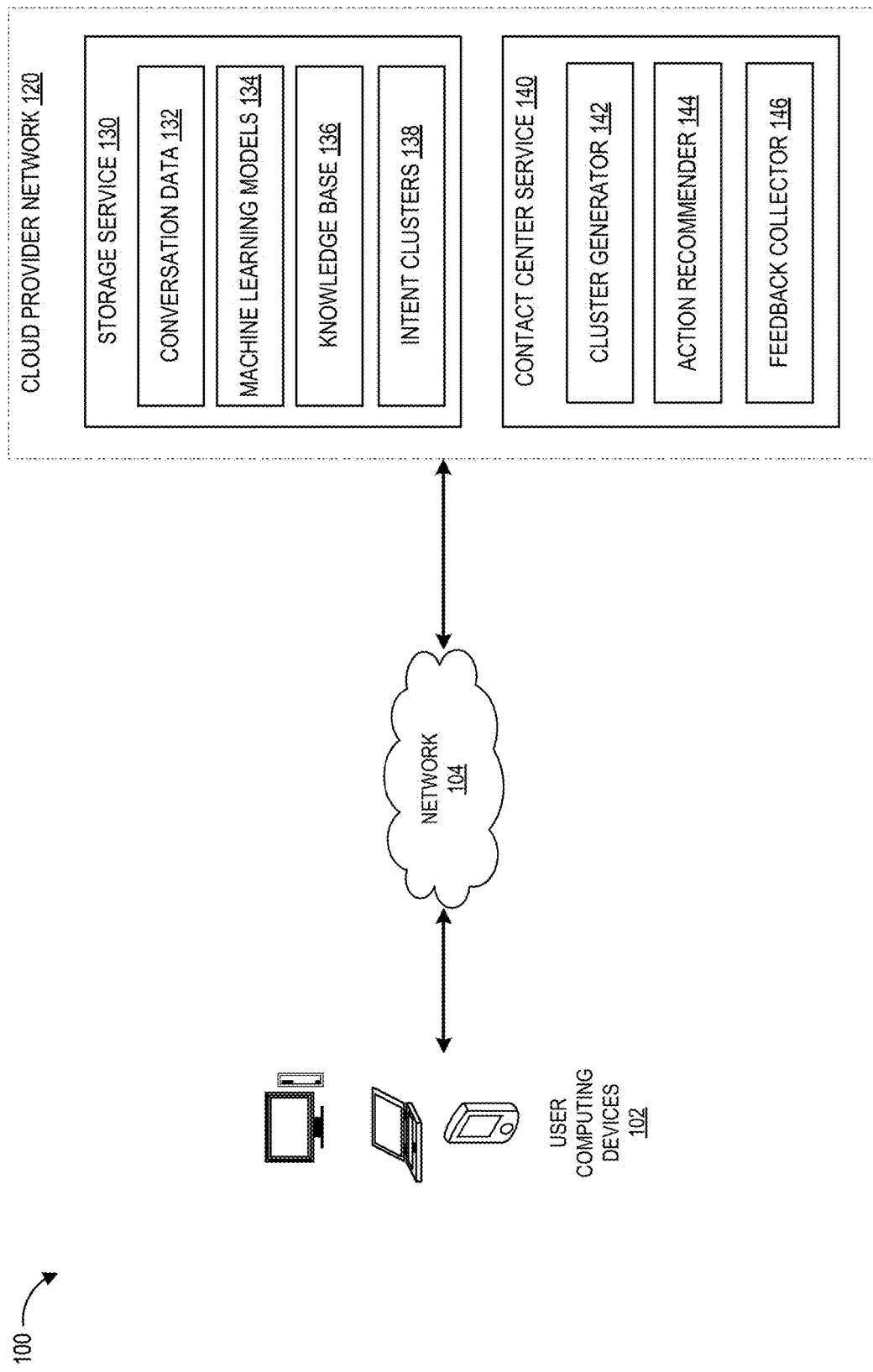
FIG. 1 depicts a schematic diagram of a cloud provider network in which various embodiments according to the present disclosure can be implemented.

Generally described, aspects of the present disclosure relate to methods, apparatus, systems, and non-transitory computer-readable storage media for document recommendation based on conversational logs for real time assistance. According to some embodiments, a contact center service providing contact center functionalities provides assistance to agents during conversations by intelligently determining when to recommend assistance and separately determining what assistance to provide. Embodiments described in the present disclosure apply machine learning (ML) models to learn relevant portions of a conversation that trigger assistance and identify relevant assistance information (e.g., documents, articles, phone numbers, website addresses, physical addresses, contact information, etc.). Accurately identifying relevant assistance information (e.g., what assistance to provide to an agent) reduces computing resources required by a system and beneficially provides superior chat assistance in the form of relevant recommended subject matter at relevant time(s) in the conversation.

In particular, identifying relevant assistance shortens a duration of a conversation, freeing up both computing resources (e.g., bandwidth, processing time, memory, power, etc.) and human resources (e.g., agents that can perform different tasks). For example, an agent (e.g., a first user) that is presented with relevant assistance at a relevant time during a voice conversation with a customer (e.g., a second user) can swiftly address the customer's needs and answer a next call (e.g., a conversation with a third user). In this manner, ML models are conservatively executed, reducing the expenditure of wasteful resources. Moreover, resources are conserved by swiftly addressing subsequent customers, resulting in reducing any resource required to manage a queue of customers.

Traditional systems, however, lack the capability to reliably identify portions of a conversation triggering assistance. In these systems, assistance may not be triggered enough, leaving an agent in need of assistance, or alternatively, too much assistance is provided, flooding the agent with irrelevant information. Thus, traditional systems are unable to provide timely and relevant assistance recommendations.

Further, ML models are typically trained on annotated data for specific tasks. In the context of call centers, in order to create a model that detects when a customer mentions food safety issues, a dataset with examples of customer utterances that contain the issue may need to be provided for model training. Call center administrators are subject matter experts for their own domain and are the ideal annotators for data. However, eliciting annotations from administrators can be a challenging task, since they have no context as to how the models are created, nor can they be expected to memorize task-specific annotation conventions that professional annotators would be expected to follow. The techniques described in the present disclosure can allow historical contact center transcripts to be used to generate clusters of meaningful intents that can be detected in future customer conversations and update the clusters based on agent feedback, thereby reducing the cognitive load on administrators in training the models and facilitating and improving the agents' ability to resolve customer issues, which can result in a reduction in the amount of computing resources consumed during customer conversations.

These and other aspects of the disclosure will now be described with regard to certain examples and embodiments, which are intended to illustrate but not limit the disclosure. Although the examples and embodiments described herein will focus, for the purpose of illustration, specific calculations and algorithms, one of skill in the art will appreciate the examples are illustrate only, and are not intended to be limiting.

Overview of Example Contact Center Service

FIG. 1 depicts an example computing environment 100 including a cloud provider network 120 in which the disclosed cluster generation, real time action recommendation, and cluster modification techniques, among others, can be implemented. The cloud provider network (or just "cloud") 120 refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

The cloud provider network 120 can be accessed by user computing devices 102 over a network 104. The cloud provider network 120 includes a storage service 130 and a contact center service 140 that are in networked communication with one another and with the network 104 to provide users (e.g., contact center agents and/or admins) with on-demand access to the services described herein. The cloud provider network 120 can further provide the users with the ability to use one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources can be provided as services, such as a hardware virtualization service that can execute compute instances, a storage service that can store data objects, etc.

The users (or "customers") of the cloud provider networks 120 (e.g., at the user computing devices 102) can use one or more user accounts that are associated with a customer account, though these terms can be used somewhat interchangeably depending upon the context of use. Users can interact with the cloud provider network 120 across one or more networks 104 (e.g., the internet) via one or more interface(s), such as through use of application programming interface (API) calls, via a console implemented as a website or application, etc. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. Such interface(s) can be part of, or serve as a front-end to, a control plane of the cloud provider network 120 that includes "backend" services supporting and enabling the services that can be more directly offered to customers.

More specifically, the storage service 130 as implemented by the cloud provider network 120 of FIG. 1 includes conversation data 132, machine learning models 134, knowledge base 136, and intent clusters 138. The conversation data 132 may include transcripts or logs of prior conversations between users of an organization (e.g., agents) and users interacting with such an organization (e.g., customers of the organization). Although the example of transcripts and voice conversations are used, the techniques described herein may be applied to other types of communication such as text, video, gestures, etc. For example, the communication between users may occur using voice (e.g., telephone call, VoIP), text (e.g., web-based chat, application-based chat), gestures (e.g., video feed via VoIP), and the like.

In some embodiments, the conversation data 132 is parsed. For example, the uploaded transcript can be parsed into "turns" of the iterative interaction. Each turn is an interaction of the conversation, such as block of speech communicated by one of the participants. For example, the cloud provider network 120 may call a transcription engine (not shown) to parse the transcript into turns. In some embodiments, each turn can further be parsed into sentences, words, and the like. For ease of description, a turn is described as being partitioned into an utterance, which is a string of text whose length is based on a sentence (or a complete thought). However, it should be appreciated that a turn may be partitioned into words, multiple sentences, or other portions of a conversation. Additionally or alternatively, an utterance may be defined as a single word or multiple sentences. The parsed transcript may be stored as conversation data 132 in the storage service 130 in addition to the original transcription. In some embodiments, the parsed transcript replaces the conversation data 132 stored in the storage service 130.

The machine learning models 134 may include one or more machine learning models used in connection with the various operations described herein. For example, the machine learning models 134 may include trigger detection models usable to detect trigger utterances in a conversation, semantic matching models usable to convert utterances into vector embeddings intent classification models usable to identify matching intents that correspond to trigger utterances, text summarization models usable to generate summaries of intent clusters, and the like.

The knowledge base 136 may be a data structure or collection storing enterprise-specific data. For example, the knowledge base 136 can include one or more of articles, guides, solutions manuals, common questions and answers, contact information (e.g., email addresses, telephone numbers), website addresses, physical addresses, templates (e.g., email templates, letter templates, memo templates, etc.) and the like associated with some aspect of the enterprise. For example, an enterprise producing widgets may upload (as part of the knowledge base 106) a widget instruction manual to the storage service 130.

The intent clusters 138 may each represent an aggregation of past scenarios where one or more described a specific issue during a conversation with an agent. The contents of each cluster may be summarized with a text summarization model to produce a human-readable description of each cluster. Additionally, each intent in the set of intent clusters may be associated with one or more recommended actions that can be performed on the computing device of the agent during a conversation with a user. For example, a recommended action may be to display workflow next steps, reference articles, one-click actions, and the like. In some embodiments, a set of intent clusters may be automatically generated, and a subset of the set of intent clusters may be identified (e.g., by a contact center administrator or automatically based on confidence levels and/or frequency) for use in a particular customer context or for a specific user or user account. For example, a given subset of intent clusters generated and identified based on historical transcripts for a particular food vendor may be converted into an intent classification machine learning model for use in analyzing all future conversations for that food vendor.

The contact center service 140 as implemented by the cloud provider network 120 of FIG. 1 includes a cluster generator 142, an action recommender 144, and a feedback collector 146, which are logical components that correspond to one or more operations described herein. The cluster generator 142 may generate intent clusters that can be used to identify intent during live conversations. The action recommender 144 may identify, during a live conversation, one or more actions to be performed on the computing device of the agent to facilitate the conversation. The feedback collector 146 may collect feedback from one or more users (e.g., contact center admins, contact center agents, customers initiating the conversations with the contact center, etc.) and update the corresponding intent clusters and recommended actions to improve the ability of the recommended actions to facilitate the conversations. The operations of the contact center service 140 are described in greater detail below with reference to FIGS. 2-4. Further, the storage service 130 and/or the contact center service 140 may provide a set of APIs that can be used by the users of the user computing devices 102 to upload, modify, or remove any data or parameters used in connection with the techniques described herein.

Although not shown in FIG. 1, the storage service 130 and/or the contact center service 140 may provide one or more user interfaces via which the users at the user computing devices 102 may request certain actions to be performed by the storage service 130 and/or the contact center service 140 or may provide certain information to the storage service 130 and/or the contact center service 140. For example, the contact center service 140 may provide (e.g., during cluster generation) a graphical user interface that can be displayed on a user computing device 102 of an administrator at a contact center, and the administrator may, via the graphical user interface, provide input on which ones of the generated intent clusters are to be used to generate recommended actions for handling calls received at the contact center (e.g., a guide on how to walk customers through common technical difficulties). As another example, the contact center service 140 may provide (e.g., during feedback collection) a graphical user interface that can be displayed on a user computing device 102 of a contact center agent after presenting a recommendation, and the contact center agent may, via the graphical user interface, rate the degree of helpfulness of the presented recommendation.

Additional details, examples, and techniques relating to the cloud provider network and the various components thereof such as the storage service, the contact center service, and the components thereof, including those not illustrated in FIG. 1, are provided in U.S. application Ser. No. 17/958,137, titled "DOCUMENT RECOMMENDATION BASED ON CONVERSATIONAL LOG FOR REAL TIME ASSISTANCE," which is incorporated herein by reference in its entirety.

As illustrated in FIG. 1, the cloud provider network 120 can communicate over network 104 with user computing devices 102. The network 104 can include any appropriate network, including an intranet, the Internet, a cellular network, a local area network or any other such network or combination thereof. In the illustrated embodiment, the network 104 is the Internet. Protocols and components for communicating via the Internet or any of the other aforementioned types of communication networks are known to those skilled in the art of computer communications and thus, need not be described in more detail herein. User computing devices 102 can include any network-equipped computing device, for example desktop computers, laptops, smartphones, tablets, e-readers, gaming consoles, and the like. Users can access the cloud provider network 120 via the network 104 to view or manage their data and computing resources, as well as to use websites and/or applications hosted by the cloud provider network 120.

The cloud provider network 120 can be formed as a number of regions, where a region is a geographical area in which the cloud provider clusters data centers. Each region includes multiple (e.g., two or more) availability zones (AZs) connected to one another via a private high-speed network, for example a fiber communication connection. An AZ (also known as a "zone") provides an isolated failure domain including one or more data center facilities with separate power, separate networking, and separate cooling from those in another AZ. A data center refers to a physical building or enclosure that houses and provides power and cooling to servers of the cloud provider network. Preferably, AZs within a region are positioned far enough away from one another so that a natural disaster (or other failure-inducing event) should not affect or take more than one AZ offline at the same time.

Users can connect to an AZ of the cloud provider network via a publicly accessible network (e.g., the Internet, a cellular communication network), e.g., by way of a transit center (TC). TCs are the primary backbone locations linking users to the cloud provider network and can be collocated at other network provider facilities (e.g., Internet service providers (ISPs), telecommunications providers) and securely connected (e.g., via a VPN or direct connection) to the AZs. Each region can operate two or more TCs for redundancy. Regions are connected to a global network which includes private networking infrastructure (e.g., fiber connections controlled by the cloud provider) connecting each region to at least one other region. The cloud provider network can deliver content from points of presence (or "POPs") outside of, but networked with, these regions by way of edge locations and regional edge cache servers. This compartmentalization and geographic distribution of computing hardware enables the cloud provider network to provide low-latency resource access to users on a global scale with a high degree of fault tolerance and stability.

Generally, the traffic and operations of a provider network can broadly be subdivided into two categories: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes user resources that are implemented on the provider network (e.g., computing instances, containers, block storage volumes, databases, file storage). Data plane traffic generally includes non-administrative operations, such as transferring user data to and from the user resources. The control plane components are typically implemented on a separate set of servers from the data plane servers, and control plane traffic and data plane traffic can be sent over separate/distinct networks.

To provide these and other computing resource services, the cloud provider network 120 may rely upon virtualization techniques. For example, virtualization technologies can provide users the ability to control or use compute resources (e.g., a "compute instance," such as a VM using a guest operating system (O/S) that operates using a hypervisor that might or might not further operate on top of an underlying host O/S, a container that might or might not operate in a VM, a compute instance that can execute on "bare metal" hardware without an underlying hypervisor, where one or multiple compute resources can be implemented using a single electronic device. Thus, a user can directly use a compute resource (e.g., provided by a hardware virtualization service) hosted by the provider network to perform a variety of computing tasks. Additionally, or alternatively, a user can indirectly use a compute resource by submitting code to be executed by the provider network (e.g., via an on-demand code execution service), which in turn uses one or more compute resources to execute the code-typically without the user having any control of or knowledge of the underlying compute instance(s) involved.

One type of service that the cloud provider network 120 may provide may be referred to as a "managed compute service" that executes code or provides computing resources for its users in a managed configuration. Examples of managed compute services include, for example, an on-demand code execution service, a hardware virtualization service, a container service, or the like. In various examples, a "serverless" function can include code provided by a user or other entity-such as the provider network itself-that can be executed on demand. Serverless functions can be maintained within the provider network by an on-demand code execution service and can be associated with a particular user or account or can be generally accessible to multiple users/accounts. A serverless function can be associated with a Uniform Resource Locator (URL), Uniform Resource Identifier (URI), or other reference, which can be used to invoke the serverless function. A serverless function can be executed by a compute resource, such as a virtual machine, container, etc., when triggered or invoked. In some examples, a serverless function can be invoked through an application programming interface (API) call or a specially formatted HyperText Transport Protocol (HTTP) request message. Accordingly, users can define serverless functions that can be executed on demand, without requiring the user to maintain dedicated infrastructure to execute the serverless function. Instead, the serverless functions can be executed on demand using resources maintained by the provider network 120. In some examples, these resources can be maintained in a "ready" state (e.g., having a pre-initialized runtime environment configured to execute the serverless functions), allowing the serverless functions to be executed in near real-time.

Example Routine for Generating Clusters and Associating Actions

Figure 2:
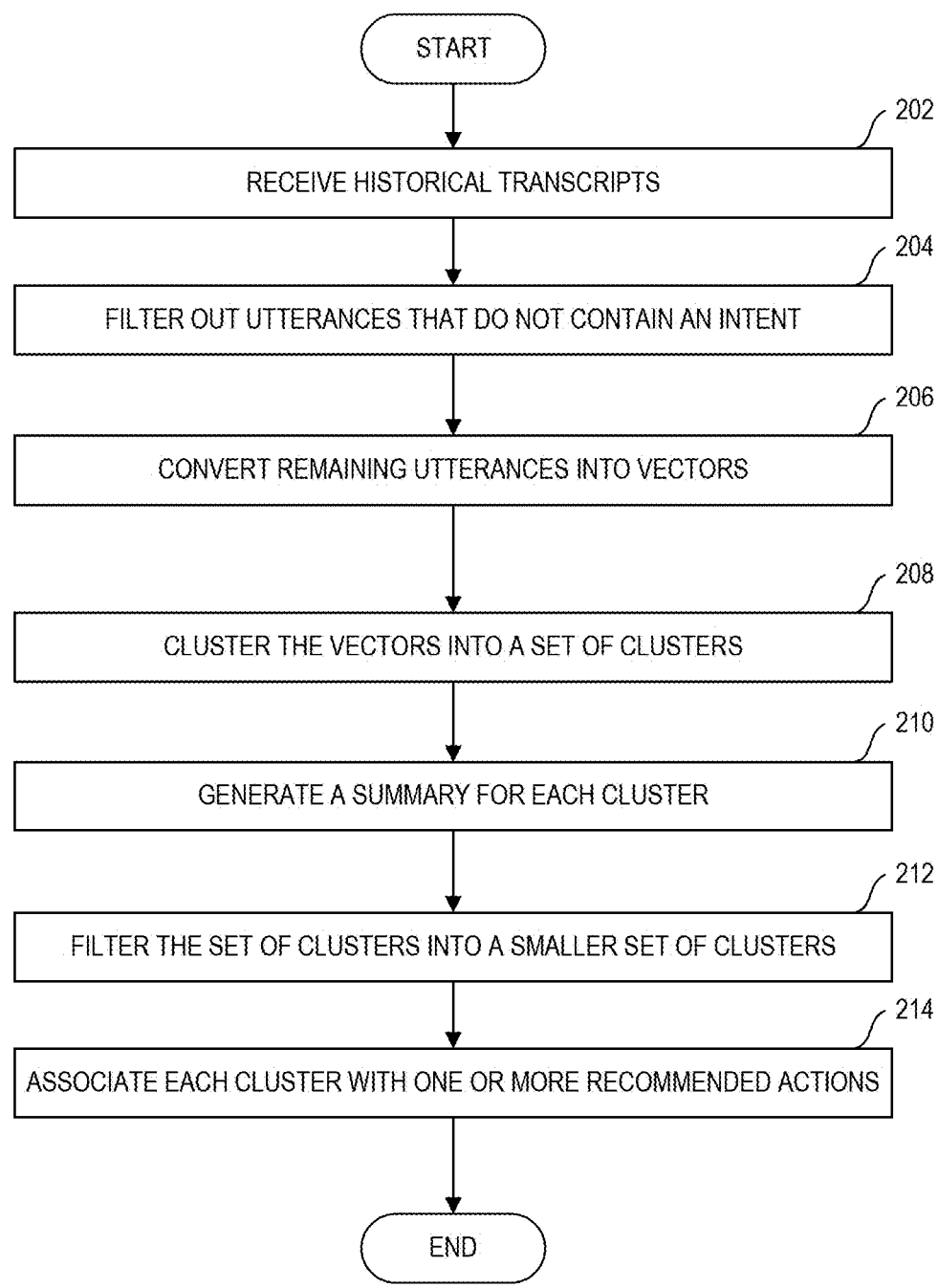
FIG. 2 is a flowchart of an example process for generating clusters and associating actions in accordance with aspects of the present disclosure.

FIG. 2 depicts an illustrative routine 200 for generating clusters and associating actions in accordance with aspects of the present disclosure. The routine 200 may be carried out, for example, by the contact center service 140 or one or more other components of the cloud provider network 120 described herein. For convenience, some or all of the steps of the routine 200 are described as being performed by the contact center service 140. For example, the contact center service 140 may include one or more hardware computing devices and non-transitory physical computer storage storing instructions that, when executed by the one or more hardware computing devices, cause the one or more hardware computing devices to perform the steps of the routine 200.

The routine 200 begins at block 202, at which the contact center service 140 receives historical transcripts (e.g., conversation data 132 of FIG. 1). The historical transcripts may include conversations between representatives of a single enterprise (e.g., agents) and customers of the enterprise. In some cases, the transcripts may include conversations for multiple enterprises.

At block 204, the contact center service 140 filters out utterances that do not contain an intent. For example, a pre-trained trigger detection model may be used to determine whether a given utterance includes an intent or not, and those that do not may be removed. In some embodiments, an utterance is a trigram including three consecutive words.

At block 206, the contact center service 140 converts the remaining utterances into vectors. In some embodiments, a semantic matching model is used to generate vectors in a 768-dimensional embedding space.

At block 208, the contact center service 140 clusters the vectors into a set of clusters. For example, the vectors may be clustered using the k-means algorithm into a number of clusters (e.g., 300 in some cases) that is greater than that eventually used for intent matching for live conversations (e.g., FIG. 3).

At block 210, the contact center service 140 generates a summary for each cluster in the set of clusters. For example, a text summarization model may be used to generate the summaries based on the identified clusters and the utterances thereof.

At block 212, the contact center service 140 filters the set of clusters into a smaller set of clusters. In some embodiments, the clusters may be ranked based on how concentrated the cluster is (e.g., based on how close the points in the cluster are to the cluster center), and a subset of clusters having a threshold ranking may be identified. Additionally or alternatively, a human admin of the contact center may add or remove clusters based on the intents, summaries, and/or personal knowledge regarding the contact center. For example, the 300 clusters may be filtered down to 20 for use for intent matching for live conversations (e.g., FIG. 3).

At block 214, the contact center service 140 associate each cluster in the smaller set of clusters with one or more recommended actions to be performed on the computing device of the agent. The routine 200 may then end.

The routine 200 can include fewer, more, or different blocks than those illustrated in FIG. 2 and/or one or more blocks illustrated in FIG. 2 may be modified, omitted, or switched without departing from the scope of the description. For example, in some embodiments, the generated clusters may be filtered (e.g., according to block 212), and summaries may be generated for the filtered clusters (e.g., according to block 210). Moreover, it will be appreciated by those skilled in the art and others that some or all of the functions described in this disclosure may be embodied in software executed by one or more processors of the cloud provider network 120 and/or the user computing device 102 disclosed herein.

Example Routine for Detecting Triggers and Recommending Actions

Figure 3:
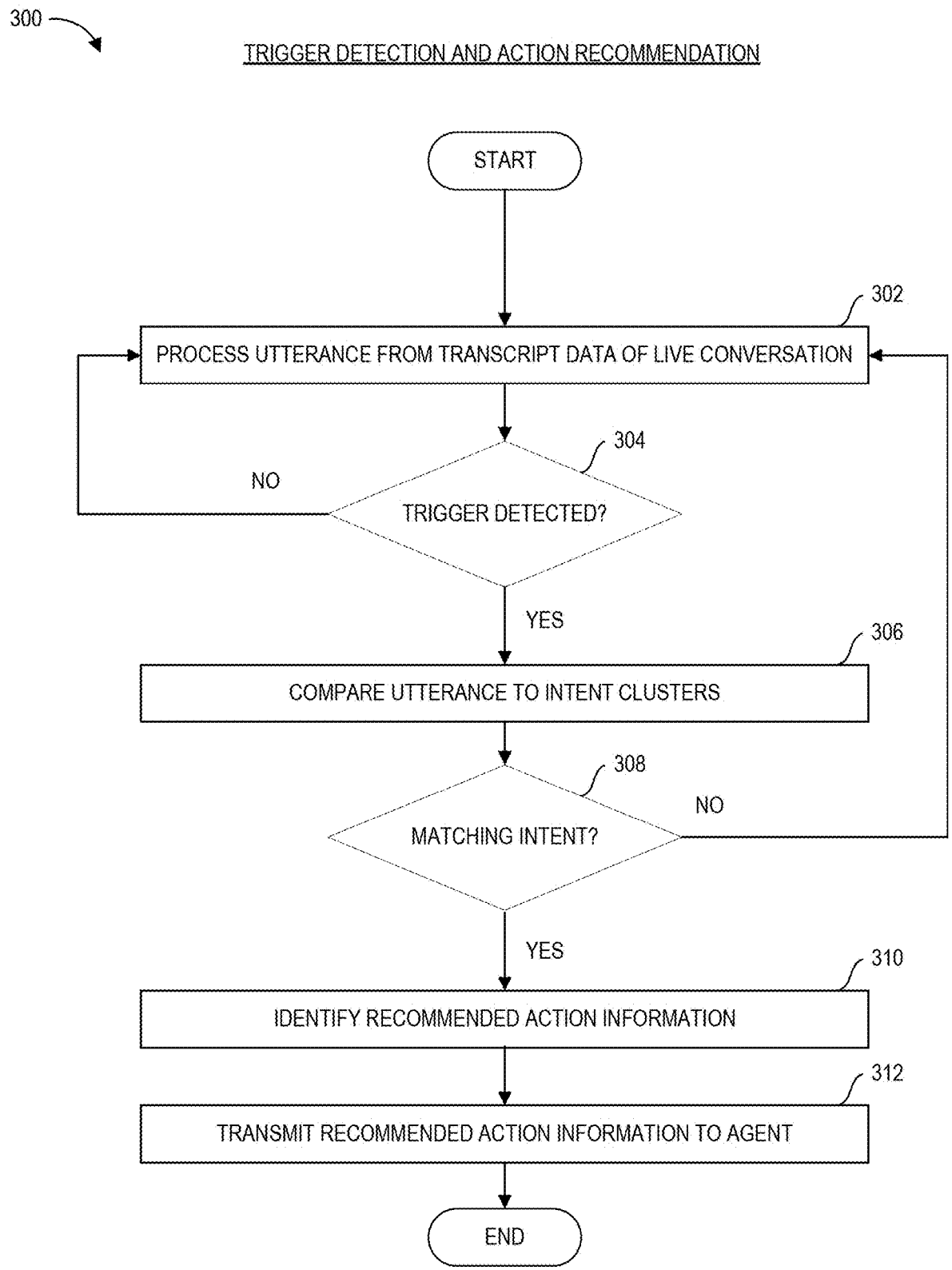
FIG. 3 is a flowchart of an example process for detecting triggers and recommending actions in accordance with aspects of the present disclosure.

FIG. 3 depicts an illustrative routine 300 for detecting triggers and recommending actions in accordance with aspects of the present disclosure. The routine 300 may be carried out, for example, by the contact center service 140 or one or more other components of the cloud provider network 120 described herein. For convenience, some or all of the steps of the routine 300 are described as being performed by the contact center service 140. For example, the contact center service 140 may include one or more hardware computing devices and non-transitory physical computer storage storing instructions that, when executed by the one or more hardware computing devices, cause the one or more hardware computing devices to perform the steps of the routine 300.

The routine 300 begins at block 302, at which the contact center service 140 processes utterances from transcript data of a live conversation between a user and an agent.

At block 304, the contact center service 140 determines whether a trigger (e.g., an utterance that indicates intent) has been detected. If the contact center service 140 determines that a trigger has been detected, the routine 300 proceeds to block 306. Otherwise, the routine 300 returns to 302. In some embodiments, in determining whether a trigger has been detected, the contact center service 140 may additionally or alternatively use the profile data associated with the user, prior utterances associated with the user or the agent, or prior turns associated with the user or the agent. For example, if the user's profile data indicates that the user recently purchased a device with Wi-Fi capabilities, the contact center service 140 may be more likely to detect a trigger when the user's utterance or turn includes "problem with Wi-Fi" but may be less likely to detect a trigger based on the same user utterance or turn if the user had not purchased any device with Wi-Fi capabilities. As another example, if the user's previous turn or utterance includes the model number of an item that is out of stock, the contact center service 140 may be more likely to detect a trigger when the user's utterance or turn includes "check on it" but may be less likely to detect a trigger based on the same user utterance or turn if the user's previous turn or utterance had not included the model number.

At block 306, the contact center service 140 compares the utterance to a set of intent clusters corresponding to the live conversation.

At block 308, the contact center service 140 determines whether a matching intent is identified. For example, the contact center service 140 may identify a matching intent based on a score calculated for the utterance and a given intent in the set of intent clusters exceeding a threshold score. If the contact center service 140 determines that a matching intent is identified, the routine 300 proceeds to block 310. Otherwise, the routine 300 returns to 302. In some embodiments, in determining whether a matching intent is identified, the contact center service 140 may additionally or alternatively use the profile data associated with the user, prior utterances associated with the user or the agent, or prior turns associated with the user or the agent. For example, if the user's profile data indicates that the user recently had a package delivered to an area prone to package theft, the contact center service 140 may be more likely to determine that the user's utterance or turn matches an intent indicating that the user wishes to resolve a stolen package issue or a missing package issue. As another example, if the user's previous turn or utterance includes the model number of an item that is out of stock, the contact center service 140 may be more likely to determine that the user's subsequent utterance or turn matches an intent indicating that the user wishes to check on the backorder status or set up a reminder for when the item is back.

At block 310, the contact center service 140 identifies the recommended action information associated with the matching intent. For example, if the matching intent indicates that the user wishes to return a recently purchased product, the recommended action information may indicate that a product return workflow is to be presented on the computing device of the agent to facilitate the agent through the requested return process. Such a workflow may include clickable hyperlinks, and activation of one or more of the hyperlinks may be recorded for the purpose of updating the quality of the recommended action for future conversations.

At block 312, the contact center service 140 transmits the recommended action information to the computing device of the agent who is part of the live conversation. For example, the recommended action information may include instructions to present one or more of the following on the computing device of the agent: a documentation including one or more clickable links, a flow diagram, and a link selectable by the agent via the user interface, a website address, an email address, a telephone number, a physical address, contact information, a template email, and a document. In response, the computing device of the agent may perform one or more actions such as display a document on a display screen of the computing device to assist the agent facilitate the live conversation and to better address the issue raised by the user. In some embodiments, the transmitted recommended action information may include contextual information that indicates the context in which the recommended action information was identified (e.g., identifying the matching intent, the utterance in the transcript, and/or the ranking/relevance of the recommended action).

In some embodiments, the contact center service 140 transmits the recommended action information to the computing device of the agent after the live conversation has been initiated. For example, the contact center service 140 may identify the recommended action information based on an utterance detected during the live conversation. In other embodiments, the contact center service 140 transmits the recommended action information to the computing device of the agent before the live conversation has been initiated. For example, the contact center service 140 may identify the recommended action information based on customer profile data and/or a customer input provided to an automated voice or chat system (e.g., via an interactive voice response system or chat function on a company website), and the identified recommended action information may be transmitted to the agent's computing device prior to the agent being connected to the customer. As another example, after the live conversation has ended, there may be steps to be performed by the agent on the agent's computing device, and the contact center service 140 may identify the recommended action information based on the customer profile data and/or the utterances during the live conversation, and the identified recommended action information may be transmitted to the agent's computing device after the agent has been disconnected from the customer. The routine 300 may then end.

The routine 300 can include fewer, more, or different blocks than those illustrated in FIG. 3 and/or one or more blocks illustrated in FIG. 3 may be modified, omitted, or switched without departing from the scope of the description. Moreover, it will be appreciated by those skilled in the art and others that some or all of the functions described in this disclosure may be embodied in software executed by one or more processors of the cloud provider network 120 and/or the user computing device 102 disclosed herein.

Example Routine for Collecting Feedback and Modifying Clusters

Figure 4:
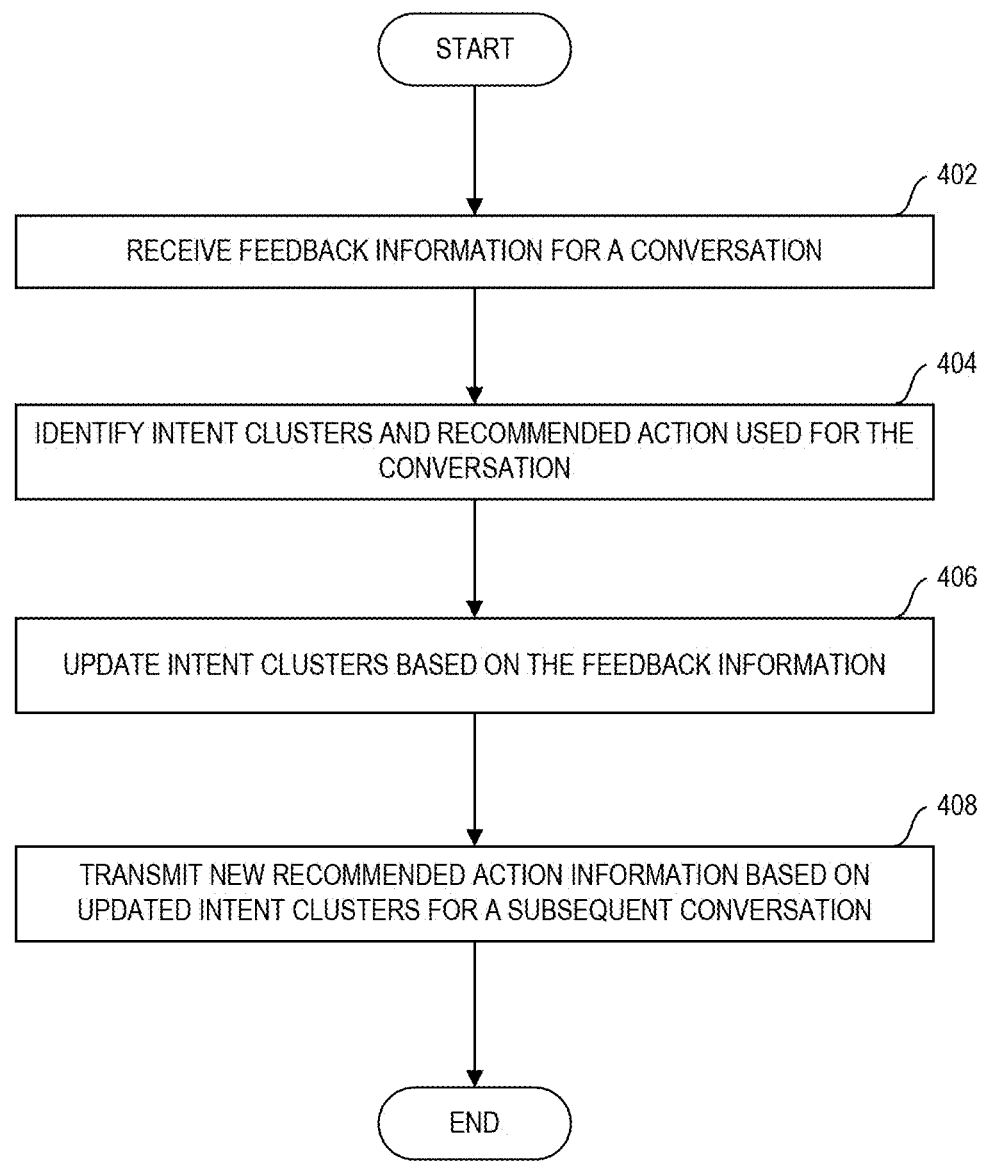
FIG. 4 is a flowchart of an example process for collecting feedback and modifying clusters in accordance with aspects of the present disclosure.

FIG. 4 depicts an illustrative routine 400 for collecting feedback and modifying clusters in accordance with aspects of the present disclosure. The routine 400 may be carried out, for example, by the contact center service 140 or one or more other components of the cloud provider network 120 described herein. For convenience, some or all of the steps of the routine 400 are described as being performed by the contact center service 140. For example, the contact center service 140 may include one or more hardware computing devices and non-transitory physical computer storage storing instructions that, when executed by the one or more hardware computing devices, cause the one or more hardware computing devices to perform the steps of the routine 400.

The routine 400 begins at block 402, at which the contact center service 140 receives feedback information associated with a conversation between a user and an agent. For example, the feedback information may include one or more of (i) a recommendation rating provided by the agent for the action performed on the computing device in response to the transmission of the recommended action information (e.g., thumbs up/down, a score of 1-10, etc.), (ii) a conversation rating provided by the user for the conversation (e.g., thumbs up/down, a score of 1-10, etc.), and (iii) one or more agent actions recorded as being performed on the computing device by the agent subsequent to the action being performed on the computing device during the conversation (e.g., whether or not a presented document was opened by the agent, % of the presented links clicked by the agent, % of a presented workflow completed by the agent, etc.). In some embodiments, the contact center service 140 receives the feedback information after the conversation has ended. In other embodiments, the contact center service 140 receives the feedback information before the conversation has ended.

In some embodiments, the feedback information may be associated with a particular intent cluster or associated with the recommended action information previously transmitted to the computing device of the agent (e.g., recommendation to display a particular training guide). For example, based on the average recommendation rating falling below or exceeding a threshold value, additional feedback may be received (e.g., based on an automatic trigger configured to detect the rating falling below or exceeding the threshold value or based on a manual review and selection by an administrator via a user interface provided by the contact center service 140) indicating that the identified recommended for a given intent should be replaced or demoted or associated with a different intent (or the relationship between the utterance and the intent and/or the relationship between the intent and the recommended action should be strengthened).

The feedback information may also be used as a label for the intent itself to provide supervised training to further update and improve the relationship between the user utterances and a given intent (e.g., to more accurately determine whether a given user utterance belongs to a given intent in the intent clusters). For example, a high clickthrough rate (e.g., above a threshold) or positive feedback from agents may strengthen the association between the utterance-intent pairing that resulted in the recommended action with the high clickthrough rate, and a low clickthrough rate (e.g., below a threshold) or negative feedback from agents may weaken the association between the utterance-intent pairing that resulted in the recommended action with the low clickthrough rate.

At block 404, the contact center service 140 identifies the set of intent clusters that was used for the conversation and the action(s) recommended/performed via the computing device of the agent during the conversation.

At block 406, the contact center service 140 updates the set of intent clusters based on the received feedback information. For example, the contact center service 140 may update the order in which two or more sets of recommended action information are associated with the intent previously determined to match the utterance in the conversation (e.g., to increase or decrease the ranked position or priority of the previously recommended action). As another example, the contact center service 140 may update (e.g., increase or decrease) the rating associated with the recommended action information transmitted to the computing device of the agent during the conversation between the user and the agent. As yet another example, the contact center service 140 may, based on the received feedback information, replace the recommended action assigned to a given intent with another action such that the action is no longer recommended for the given intent or assign the recommended action to a different intent such that the action is no longer recommended for the original intent and is instead recommended for the new intent different from the original intent.

At block 408, the contact center service 140 transmits new recommended action information based on the updated set of intent clusters for a subsequent conversation. The routine 400 may then end.

The routine 400 can include fewer, more, or different blocks than those illustrated in FIG. 4 and/or one or more blocks illustrated in FIG. 4 may be modified, omitted, or switched without departing from the scope of the description. Moreover, it will be appreciated by those skilled in the art and others that some or all of the functions described in this disclosure may be embodied in software executed by one or more processors of the cloud provider network 120 and/or the user computing device 102 disclosed herein.

Example Architecture of Computing System

Figure 5:
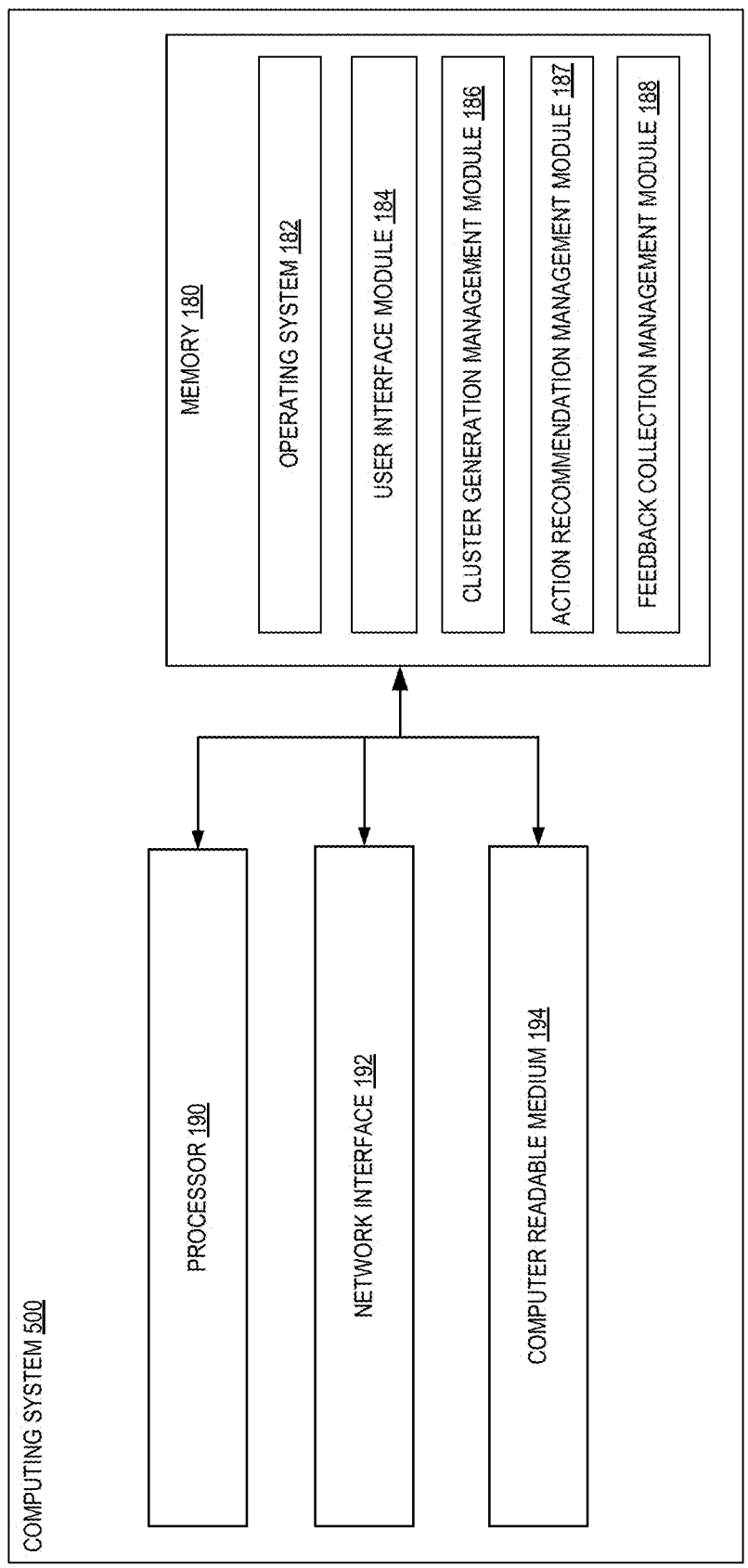
FIG. 5 depicts a general architecture of a computing device or system providing cluster generation/modification and action recommendation services in accordance with aspects of the present disclosure.

FIG. 5 depicts an example architecture of a computing system 500 that can be used to perform one or more of the techniques described herein or illustrated in FIGS. 1-4. The general architecture of the computing system 500 depicted in FIG. 5 includes an arrangement of computer hardware and software modules that may be used to implement one or more aspects of the present disclosure. The computing system 500 may include many more (or fewer) elements than those shown in FIG. 5. It is not necessary, however, that all of these elements be shown in order to provide an enabling disclosure. For example, the computing system 500 may be used to implement one or more of the elements described herein, including the contact center service 140, block store service 105, object storage service 110, and/or the user computing devices 102.

As illustrated, the computing system 500 includes a processor 190, a network interface 192, and a computer-readable medium 194, all of which may communicate with one another by way of a communication bus. The network interface 192 may provide connectivity to one or more networks or computing systems. The processor 190 may thus receive information and instructions from other computing systems or services via the network 104 illustrated in FIG. 1.

The processor 190 may also communicate with memory 180. The memory 180 may contain computer program instructions (grouped as modules in some embodiments) that the processor 190 executes in order to implement one or more aspects of the present disclosure. The memory 180 may include RAM, ROM, and/or other persistent, auxiliary, or non-transitory computer-readable media. The memory 180 may store an operating system 182 that provides computer program instructions for use by the processor 190 in the general administration and operation of the computing system 500. The memory 180 may further include computer program instructions and other information for implementing one or more aspects of the present disclosure. For example, in one embodiment, the memory 180 includes a user interface module 184 that generates user interfaces (and/or instructions therefor) for display upon a user computing device (e.g., user computing device 102 of FIG. 1), e.g., via a navigation and/or browsing interface such as a browser or application installed on the user computing device. In addition, the memory 180 may include or communicate with one or more data stores.

In addition to and/or in combination with the user interface module 184, the memory 180 may include a cluster generation management module 186, an action recommendation management module 187, and a feedback collection management module 188 that may be executed by the processor 190. In one embodiment, the cluster generation management module 186, the action recommendation management module 187, and the feedback collection management module 188 collectively implement various aspects of the present disclosure, e.g., those illustrated in FIGS. 1-4 or described with reference to FIGS. 1-4.

Although a single processor, a single network interface, a single computer-readable medium, and a single memory are illustrated in the example of FIG. 5, in other implementations, the computing system 500 can have a multiple of one or more of these components (e.g., two or more processors and/or two or more memories).

Example Implementations (EIs)

Some enumerated example implementations (EIs) are provided in this section, without limitation.

EI 1: A cloud provider system, comprising: a storage service comprising physical computer hardware and configured to store a plurality of machine learning models and a plurality of clusters of potential intents to be detected in future conversations; and a contact center service comprising physical computer hardware and in networked communication with the storage service, the contact center service configured to: obtain an utterance from a conversation between a user and an agent, wherein the utterance comprises one or more sentences of the conversation; determine, based on a trigger detection machine learning model of the plurality of machine learning models, that the utterance includes a trigger utterance; identify, based on the trigger utterance, an intent classification machine learning model of the plurality of machine learning models, and the plurality of clusters, a matching intent from a plurality of intents indicated by the plurality of clusters; identify, based on the determined matching intent, recommended action information usable to cause an action to be performed on a computing device of the agent; transmit the recommended action information to the computing device of the agent, along with contextual information associated with the recommendation, via a user interface of the computing device; receive feedback information corresponding to the conversation; and update the intent classification machine learning model of the plurality of machine learning models used to transmit the recommended action information such that the matching intent is associated with new recommended action information different from the recommended action information transmitted to the computing device of the agent.

EI 2: The cloud provider system of EI 1, wherein the trigger utterance identifies at least one of: an intent associated with the user indicating at least one of a need for assistance, a type of assistance, or information pertaining to assistance, an action of the agent, a product, or a service.

EI 3: The cloud provider system of EI 1, wherein the recommended action information is associated with at least one of a documentation including one or more clickable links, a flow diagram, and a link selectable by the agent via the user interface, a website address, an email address, a telephone number, a physical address, contact information, a template email, and a document.

EI 4: The cloud provider system of EI 1, wherein the feedback information includes one or more of (i) a recommendation rating provided by the agent for the action performed on the computing device in response to the transmission of the recommended action information, (ii) a conversation rating provided by the user for the conversation, and (iii) one or more agent actions recorded as being performed on the computing device by the agent subsequent to the action being performed on the computing device.

EI 5: A computer-implemented method, comprising: obtaining an utterance from a conversation between a user and an agent; determining, based on a plurality of intent clusters corresponding to the conversation, a matching intent from a plurality of intents indicated by the plurality of intent clusters; determining, based on the determined matching intent, recommended action information usable to cause an action to be performed on a computing device of the agent; transmitting the recommended action information to the computing device of the agent for presentation via a user interface of the computing device; receiving feedback information corresponding to the conversation; and updating the plurality of intent clusters used to transmit the recommended action information to the computing device such that the matching intent is associated with new recommended action information different from the recommended action information transmitted to the computing device.

EI 6: The computer-implemented method of EI 5, further comprising:

identifying the matching intent from the updated plurality of intent clusters for a subsequent conversation between the agent and another user; and transmitting the new recommended action information to the computing device of the agent via the user interface of the computing device during the subsequent conversation.

EI 7: The computer-implemented method of EI 5, wherein the feedback information includes one or more of (i) a recommendation rating provided by the agent for the action performed on the computing device in response to the transmission of the recommended action information, (ii) a conversation rating provided by the user for the conversation, and (iii) one or more agent actions recorded as being performed on the computing device by the agent subsequent to the action being performed on the computing device.

EI 8: The computer-implemented method of EI 5, wherein updating the plurality of intent clusters comprises updating an order in which two or more sets of recommended action information are associated with the matching intent.

EI 9: The computer-implemented method of EI 5, wherein updating the plurality of intent clusters comprises updating a rating associated with the recommended action information transmitted to the computing device of the agent.

EI 10: The computer-implemented method of EI 5, further comprising causing contextual information to be presented via the user interface along with performing the action, wherein the contextual information indicates a context in which the recommended action information was identified.

EI 11: The computer-implemented method of EI 5, wherein the utterance identifies at least one of: an intent associated with the user indicating at least one of a need for assistance, a type of assistance, or information pertaining to assistance, an action of the agent, a product, or a service.

EI 12: The computer-implemented method of EI 5, wherein the recommended action information is associated with at least one of a documentation including one or more clickable links, a flow diagram, and a link selectable by the agent via the user interface, a website address, an email address, a telephone number, a physical address, contact information, a template email, and a document.

EI 13: A non-transitory computer-readable medium storing instructions that, when executed by a computing system, cause the computing system to perform operations comprising: obtaining an utterance from a conversation between a user and an agent; determining, based on a plurality of intent clusters corresponding to the conversation, a matching intent from a plurality of intents indicated by the plurality of intent clusters; determining, based on the determined matching intent, recommended action information usable to cause an action to be performed on a computing device of the agent; transmitting the recommended action information to the computing device of the agent for presentation via a user interface of the computing device; receiving feedback information corresponding to the conversation; and updating the plurality of intent clusters used to transmit the recommended action information to the computing device such that the matching intent is associated with new recommended action information different from the recommended action information transmitted to the computing device.

EI 14: The non-transitory computer-readable medium of EI 13, wherein the operations further comprise: identifying the matching intent from the updated plurality of intent clusters for a subsequent conversation between the agent and another user; and transmitting the new recommended action information to the computing device of the agent via the user interface of the computing device during the subsequent conversation.

EI 15: The non-transitory computer-readable medium of EI 13, wherein the feedback information includes one or more of (i) a recommendation rating provided by the agent for the action performed on the computing device in response to the transmission of the recommended action information, (ii) a conversation rating provided by the user for the conversation, and (iii) one or more agent actions recorded as being performed on the computing device by the agent subsequent to the action being performed on the computing device.

EI 16: The non-transitory computer-readable medium of EI 13, wherein updating the plurality of intent clusters comprises updating an order in which two or more sets of recommended action information are associated with the matching intent.

EI 17: The non-transitory computer-readable medium of EI 13, wherein updating the plurality of intent clusters comprises updating a rating associated with the recommended action information transmitted to the computing device of the agent.

EI 18: The non-transitory computer-readable medium of EI 13, wherein the operations further comprise further comprising causing contextual information to be presented via the user interface along with performing the action, wherein the contextual information indicates a context in which the recommended action information was identified.

EI 19: The non-transitory computer-readable medium of EI 13, wherein the utterance identifies at least one of: an intent associated with the user indicating at least one of a need for assistance, a type of assistance, or information pertaining to assistance, an action of the agent, a product, or a service.

EI 20: The non-transitory computer-readable medium of EI 13, wherein the recommended action information is associated with at least one of a documentation including one or more clickable links, a flow diagram, and a link selectable by the agent via the user interface, a website address, an email address, a telephone number, a physical address, contact information, a template email, and a document.

Terminology

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid-state memory chips or magnetic disks, into a different state. In some embodiments, the computer system may be a cloud-based computing system whose processing resources are shared by multiple distinct business entities or other users.

The processes described herein or illustrated in the figures of the present disclosure may begin in response to an event, such as on a predetermined or dynamically determined schedule, on demand when initiated by a user or system administrator, or in response to some other event. When such processes are initiated, a set of executable program instructions stored on one or more non-transitory computer-readable media (e.g., hard drive, flash memory, removable media, etc.) may be loaded into memory (e.g., RAM) of a server or other computing device. The executable instructions may then be executed by a hardware-based computer processor of the computing device. In some embodiments, such processes or portions thereof may be implemented on multiple computing devices and/or multiple processors, serially or in parallel.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multithreaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the scope of the disclosure. As can be recognized, certain embodiments described herein can be embodied within a form that does not provide all of the features and benefits set forth herein, as some features can be used or practiced separately from others. All changes which come within the meaning and range of equivalency of the claims are to be embraced within their scope.

What is claimed is:

1. A cloud provider system, comprising:
   a storage service comprising physical computer hardware and configured to store a plurality of machine learning models and a plurality of clusters of potential intents to be detected in future conversations; and
   a contact center service comprising physical computer hardware and in networked communication with the storage service, the contact center service configured to:
      obtain an utterance from a conversation between a user and an agent,
      wherein the utterance comprises one or more sentences of the conversation;

determine, based on a trigger detection machine learning model of the plurality of machine learning models, that the utterance includes a trigger utterance;

identify, based on the trigger utterance, an intent classification machine learning model of the plurality of machine learning models, and the plurality of clusters, a matching intent from a plurality of intents indicated by the plurality of clusters;

identify, based on the determined matching intent, recommended action information usable to cause an action to be performed on a computing device of the agent;

transmit the recommended action information to the computing device of the agent, along with contextual information associated with the recommendation, via a user interface of the computing device;

receive feedback information corresponding to the conversation; and update the intent classification machine learning model of the plurality of machine learning models used to transmit the recommended action information such that the matching intent is associated with new recommended action information different from the recommended action information transmitted to the computing device of the agent.

2. The cloud provider system of claim 1, wherein the trigger utterance identifies at least one of:
an intent associated with the user indicating at least one of a need for assistance, a type of assistance, or information pertaining to assistance,
an action of the agent,
a product, or
a service.

3. The cloud provider system of claim 1, wherein the recommended action information is associated with at least one of a documentation including one or more clickable links, a flow diagram, and a link selectable by the agent via the user interface, a website address, an email address, a telephone number, a physical address, contact information, a template email, and a document.

4. The cloud provider system of claim 1, wherein the feedback information includes one or more of (i) a recommendation rating provided by the agent for the action performed on the computing device in response to the transmission of the recommended action information, (ii) a conversation rating provided by the user for the conversation, and (iii) one or more agent actions recorded as being performed on the computing device by the agent subsequent to the action being performed on the computing device.

5. A computer-implemented method, comprising:
obtaining an utterance from a conversation between a user and an agent;
determining, based on a plurality of intent clusters corresponding to the conversation, a matching intent from a plurality of intents indicated by the plurality of intent clusters;
determining, based on the determined matching intent, recommended action information usable to cause an action to be performed on a computing device of the agent;
transmitting the recommended action information to the computing device of the agent for presentation via a user interface of the computing device;
receiving feedback information corresponding to the conversation; and
updating the plurality of intent clusters used to transmit the recommended action information to the computing device such that the matching intent is associated with new recommended action information different from the recommended action information transmitted to the computing device.

6. The computer-implemented method of claim 5, further comprising:
identifying the matching intent from the updated plurality of intent clusters for a subsequent conversation between the agent and another user; and
transmitting the new recommended action information to the computing device of the agent via the user interface of the computing device during the subsequent conversation.

7. The computer-implemented method of claim 5, wherein the feedback information includes one or more of (i) a recommendation rating provided by the agent for the action performed on the computing device in response to the transmission of the recommended action information, (ii) a conversation rating provided by the user for the conversation, and (iii) one or more agent actions recorded as being performed on the computing device by the agent subsequent to the action being performed on the computing device.

8. The computer-implemented method of claim 5, wherein updating the plurality of intent clusters comprises updating an order in which two or more sets of recommended action information are associated with the matching intent.

9. The computer-implemented method of claim 5, wherein updating the plurality of intent clusters comprises updating a rating associated with the recommended action information transmitted to the computing device of the agent.

10. The computer-implemented method of claim 5, further comprising causing contextual information to be presented via the user interface along with performing the action, wherein the contextual information indicates a context in which the recommended action information was identified.

11. The computer-implemented method of claim 5, wherein the utterance identifies at least one of:
an intent associated with the user indicating at least one of a need for assistance, a type of assistance, or information pertaining to assistance,
an action of the agent,
a product, or
a service.

12. The computer-implemented method of claim 5, wherein the recommended action information is associated with at least one of a documentation including one or more clickable links, a flow diagram, and a link selectable by the agent via the user interface, a website address, an email address, a telephone number, a physical address, contact information, a template email, and a document.

13. A non-transitory computer-readable medium storing instructions that, when executed by a computing system, cause the computing system to perform operations comprising:
obtaining an utterance from a conversation between a user and an agent;
determining, based on a plurality of intent clusters corresponding to the conversation, a matching intent from a plurality of intents indicated by the plurality of intent clusters;
determining, based on the determined matching intent, recommended action information usable to cause an action to be performed on a computing device of the agent;

transmitting the recommended action information to the computing device of the agent for presentation via a user interface of the computing device;

receiving feedback information corresponding to the conversation; and updating the plurality of intent clusters used to transmit the recommended action information to the computing device such that the matching intent is associated with new recommended action information different from the recommended action information transmitted to the computing device.

14. The non-transitory computer-readable medium of claim 13, wherein the operations further comprise:

identifying the matching intent from the updated plurality of intent clusters for a subsequent conversation between the agent and another user; and transmitting the new recommended action information to the computing device of the agent via the user interface of the computing device during the subsequent conversation.

15. The non-transitory computer-readable medium of claim 13, wherein the feedback information includes one or more of (i) a recommendation rating provided by the agent for the action performed on the computing device in response to the transmission of the recommended action information, (ii) a conversation rating provided by the user for the conversation, and (iii) one or more agent actions recorded as being performed on the computing device by the agent subsequent to the action being performed on the computing device.

16. The non-transitory computer-readable medium of claim 13, wherein updating the plurality of intent clusters comprises updating an order in which two or more sets of recommended action information are associated with the matching intent.

17. The non-transitory computer-readable medium of claim 13, wherein updating the plurality of intent clusters comprises updating a rating associated with the recommended action information transmitted to the computing device of the agent.

18. The non-transitory computer-readable medium of claim 13, wherein the operations further comprise further comprising causing contextual information to be presented via the user interface along with performing the action, wherein the contextual information indicates a context in which the recommended action information was identified.

19. The non-transitory computer-readable medium of claim 13, wherein the utterance identifies at least one of:

an intent associated with the user indicating at least one of a need for assistance, a type of assistance, or information pertaining to assistance, an action of the agent, a product, or a service.

20. The non-transitory computer-readable medium of claim 13, wherein the recommended action information is associated with at least one of a documentation including one or more clickable links, a flow diagram, and a link selectable by the agent via the user interface, a website address, an email address, a telephone number, a physical address, contact information, a template email, and a document.

* * * * *